United States Patent [19]

Sempolinski

[11] Patent Number: 4,917,934

[45] Date of Patent: Apr. 17, 1990

[54] TELESCOPE MIRROR BLANK AND METHOD OF PRODUCTION

[75] Inventor: Daniel R. Sempolinski, Painted Post, N.Y.

[73] Assignee: Corning Incorporated, Corning, N.Y.

[21] Appl. No.: 343,573

[22] Filed: Apr. 27, 1989

[51] Int. Cl.$^4$ .................... C03B 23/207; G02B 5/08; E05F 15/20

[52] U.S. Cl. ..................... 428/116; 65/18.1; 65/18.3; 65/18.4; 65/23; 65/36; 65/38; 65/42; 65/43; 156/89; 264/248; 264/259; 428/118; 428/119

[58] Field of Search ......... 65/18.1, 18.3, 18.4, 65/23, 36, 42, 38, 43; 156/89; 264/248, 259; 428/116, 118, 119

[56] References Cited

U.S. PATENT DOCUMENTS

| | | | |
|---|---|---|---|
| 3,272,686 | 9/1966 | Smith | 65/43 UX |
| 3,283,655 | 11/1966 | Rau | 65/36 X |
| 3,320,044 | 5/1967 | Cole et al. | 65/36 X |
| 3,507,737 | 4/1970 | Busdiecker | 65/43 X |
| 3,644,022 | 2/1972 | Jagdt et al. | 65/38 UX |
| 3,940,301 | 2/1976 | Straw et al. | 65/23 X |
| 4,816,051 | 3/1989 | Clasen et al. | 65/18.1 X |

Primary Examiner—Arthur Kellogg
Attorney, Agent, or Firm—Clinton S. Janes, Jr.; Milton M. Peterson

[57] ABSTRACT

A telescope mirror blank having a supporting network core composed of sintered ceramic struts, and a method of forming such core from a thermally crystallizable, powdered glass and as a separate component from the faceplate, are disclosed. Optionally, the mirror faceplate may be formed in a similar manner.

26 Claims, 2 Drawing Sheets

TELESCOPE MIRROR BLANK AND METHOD OF PRODUCTION

FIELD OF THE INVENTION

The field of the invention is telescope mirror blanks, and production methods for such blanks. The invention is particularly concerned with a blank composed of a solid faceplate, an open network core and, optionally, a back plate, the backing members supporting the faceplate and strengthening the structure. It is also concerned with a novel method of producing these components separately.

BACKGROUND OF THE INVENTION

At one time, telescope mirror blanks were produced in one piece. A glass having a low coefficient of thermal expansion, e.g., a borosilicate glass, was cast around and over refractory cores in a large mold. Removal of the cores on cooling provided a strong integral blank of less weight than a solid body due to the open network.

With a desire for greater instrumental precision came recognition of the need to lessen the effect of ambient thermal change. This led to blanks composed of either a fused silica or a glass-ceramic material having a near-zero coefficient of thermal expansion, that is, zero plus or minus a ten point range.

This development alleviated the problem of ambient temperature change during instrument operation, but had little effect on other problems. A blank was still extremely heavy and, consequently, difficult to maneuver. Further, a lengthy time was required to cast, or otherwise mold, a glass blank, and then carry out further processing steps, such as glass crystallization. However, the most serious problem arose from the need for relatively high glass melting and crystallizing temperatures which were difficult to maintain and control.

In an effort to alleviate forming problems, it has been proposed to produce the plates and supporting core separately. The parts could then be sealed together either by direct fusion or by an intermediate frit seal. However, this still entailed the use of very high temperatures to melt, crystallize and/or seal near-zero expansion materials. Further, fabricating and assembling the core components were tedious operations, and the structures were prone to distort during the processing.

PURPOSES OF THE INVENTION

A basic purpose is to provide an improved telescope mirror blank having a supporting network core.

Another purpose is to provide such mirror blank wherein the plates and supporting network are formed separately.

A further purpose is to provide a method of producing the supporting network and/or the plates at relatively low temperatures.

A still further purpose is to utilize ceramic powder processing techniques in the production of telescope mirror blanks.

Another purpose is to provide a simpler and more expeditious method of producing a telescope mirror blank.

PRIOR LITERATURE

U.S. Pat. No. 3,112,184 (Hollenbach) describes forming a honeycomb structure from strips of carrier material coated on both sides with a ceramic slurry. One strip is corrugated and another is flat, and the two are coiled together and sintered with the peaks on the corrugated strip sintering to the flat strip. The patent is not concerned with materials and processing techniques unique to mirror blanks.

U.S. Pat. No. 3,272,686 (Smith et al.) discloses uniting sheets of low expansion ceramic with opposite sides of a honeycomb structure, such as disclosed by Hollenbach, by a foamed sealing material. The patent does not teach processing of near-zero expansion materials.

U.S. Pat. No. 3,507,737 (Busdiecker et al.) produces a telescope mirror blank composed of two thermally crystallizable glass sheets separated by and sealed to a network core of crystallizable glass which may be composed of slotted strips interlocked in eggcrate fashion. The assembly is heated above the nucleating temperature to seal the glass members together, and then cooled in controlled manner to nucleate and crystallize the glass. The patent is not concerned with powder processing techniques, and does not avoid the necessity for fusing temperatures and consequent distortion.

U.S. Pat. No. 4,315,991 (Hagy et al.) discloses a family of $Li_2O$-$MgO$-$ZnO$-$Al_2O_3$-$SiO_2$ devitrifiable sealing glasses which have additions of $Cs_2O$, $Rb_2O$ and/or $K_2O$ to delay crystallizing of the glass and thus facilitate making seals. The glasses are used in sealing a glass core structure to a faceplate in making a telescope mirror blank. This disclosure is concerned only with using finely divided material to seal preformed parts into a structure and not with sintering such materials to form structural elements.

U.S. Pat. No. 4,707,458 (Chyung et al.) discloses transparent glass-ceramic bodies having a beta-quartz solid solution as the sole crystal phase, having a thermal coefficient of expansion between $-1$ and $+1 \times 10^{-7}/°$ C. over the range of $-50°$ to $+100°$ C., and being especially suited to use in ring laser gyro production. The patent is not concerned with processing these compositions as powders.

SUMMARY OF THE INVENTION

The article of my invention is an improved telescope mirror blank comprising a faceplate, a supporting network core and, optionally, a back plate wherein the core is a plurality of thin, sintered ceramic struts frit sealed to form a network which, in turn, is frit sealed to the plates. The sintered struts may be single layer, tape cast or extruded strips, or a laminate of a plurality of strips. In one embodiment, the sintered struts and the sealing frit may be a crystallized glass. In another embodiment, the plates may be formed by laminating tape cast sheets and sintering.

The invention further resides in a method of producing a telescope mirror blank comprising a faceplate, a supporting network core and, optionally, a back plate which comprises the steps of forming a slurry of a powdered glass capable of being converted to a glass-ceramic having a coefficient of thermal expansion between $-10$ and $+10 \times 10^{-7}/°$ C. over the temperature range of $0°$ to $300°$ C., forming thin strips from the slurry, sintering the strips, assembling the strips and frit sealing them into a rigid network. In one embodiment, the strips are cut to predetermined lengths and slotted to permit interlocking assembly in eggcrate style.

DESCRIPTION OF THE INVENTION

Tape casting is a process familiar to the ceramic art. Basically, it embodies reducing a glass or ceramic material to a finely divided state, mixing the finely divided material with a volatile liquid medium to form a flowable slurry, applying a thin layer of the slurry over an impervious supporting material (the tape) and drying to form a self-supporting, releasable sheet or strip.

Figure 1:
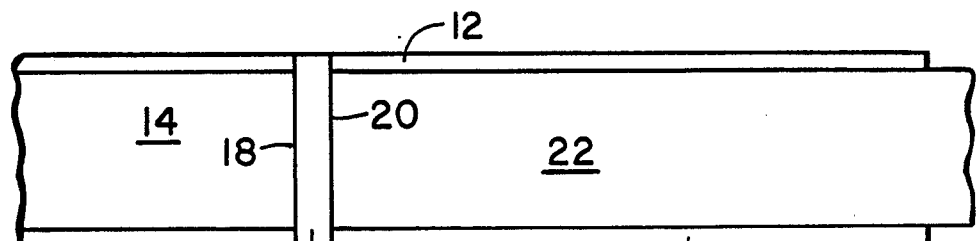
FIG. 1 is a top plan view of an apparatus for tape casting a ceramic.

FIG. 1 shows a casting table 10 having side rails 12—12. A sheet 14 of impervious plastic material, such as that available under the trademark MYLAR, is supported within side rails 12—12, and a casting chamber 16 rides on their upper surfaces. Chamber 16 may be a rectangular structure with vertical walls and an open bottom and top. Front wall 18 extends to the surface of tape 14, while the base of rear wall 20 is sufficiently spaced from the tape to permit slurry to flow out in a desired thickness as indicated by numeral 22.

Figure 2:
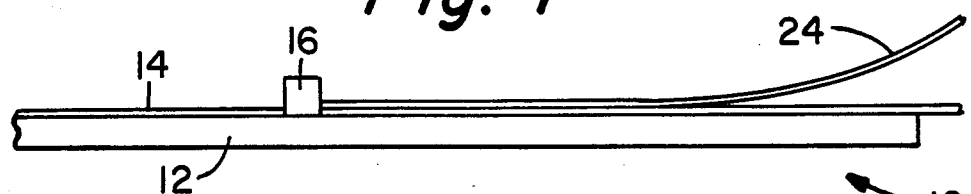
FIG. 2 is a side view of the apparatus of FIG. 1.

Chamber 16 is adapted to be filled with a casting slurry and then drawn by tractors (not shown) along rails 12—12 to deliver a thin layer of slurry 22 on tape 14. The thickness of layer 22, and thereby the thickness of dried strip 24, depends on the travel rate of chamber 16, the viscosity of the slurry, and the spacing of back wall 20 from the tape. Thus, a dried strip 24 of predetermined thickness may be separated from tape 14 as indicated in FIG. 2.

Slurry may be formed with a low expansion, sinterable glass capable of being crystallized in situ to a glass-ceramic state. I have found the sealing glass frits described in U.S. Pat. No. 4,315,991 to be particularly useful. These glasses, when crystallized, are compatible with materials having thermal expansion coefficients in the range of $-5$ to $+5 \times 10^{-7}/°C$. (0°–300° C.), and may be sintered and crystallized at temperatures in the range of 900°–1000° C. Their basic chemical composition consists essentially, as expressed in weight percent on an oxide basis, of about 1–2% $Li_2O$, 0.7–1.5% $MgO$, 9–13% $ZnO$, 19–23% $Al_2O_3$ and 62–68% $SiO_2$. It further contains at least 1% $K_2O + Rb_2O + Cs_2O$ in the indicated proportions of 0–3% $K_2O$, 0–4% $Rb_2O$ and 0–6% $Cs_2O$. This inhibits crystallization, and thereby facilitates sintering. The crystallized glass has a primary crystal phase of zinc beta-quartz crystals.

The glasses are reduced to an average particle size of about 9–10 microns. The powder is then suspended in a mixture of volatile organics that may, for example, include ethanol, xylene, dibutyl phthalate and polyvinyl butyral. After intimate mixing and deairing, the slurry is ready for casting.

A quantity of the slurry thus produced is placed in 16 and the chamber is drawn along table 10 from right to left. This forms a thin layer 22 which, when dried, may be stripped from tape 14 as a "green" strip 24. Depending on the thickness desired in the sintered product, strip 24 may be employed as cast, or a plurality of strips may be stacked to form a laminated strip. In either case, the strip may then be cut into predetermined lengths to form network struts. These struts are sintered in air, for example, for 30 minutes at 950° C. when using glasses as disclosed in the Hagy et al. patent. The sintered strips may then be machined using a diamond wheel saw. This removes any edge distortions, and also provides slots for assembly if desired.

While the invention is described primarily with reference to glasses disclosed in the Hagy et al. patent, other known low expansion glasses may also be employed. For example, $Li_2O$-$MgO$-$ZnO$-$Al_2O_3$-$TiO_2$-$ZrO_2$-$SiO_2$ glasses disclosed in U.S. Pat. No. 4,707,458 (Chyung et al.) have also been used successfully. In the interest of using lower production temperatures, the nucleating agents $TiO_2$ and $ZrO_2$ have been omitted from these compositions, since crystallization tends to occur during sintering without the aid of the nucleating agents.

Figure 3:
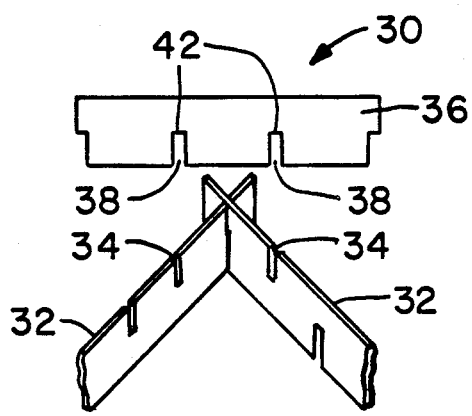
FIG. 3 is an exploded, fragmentary view of a partial core assembly in accordance with an embodiment of the present invention.

FIG. 3 is an exploded view of a partial core assembly 30 in accordance with a preferred embodiment of the invention. Partial assembly 30 includes two interlocking struts 32 having slots 34 adapted to receive a cross strut 36 having slots 38. The latter are adapted to cooperate with slots 34 to form an interlocking structure. It will be appreciated that other geometries are also possible.

Figure 4:
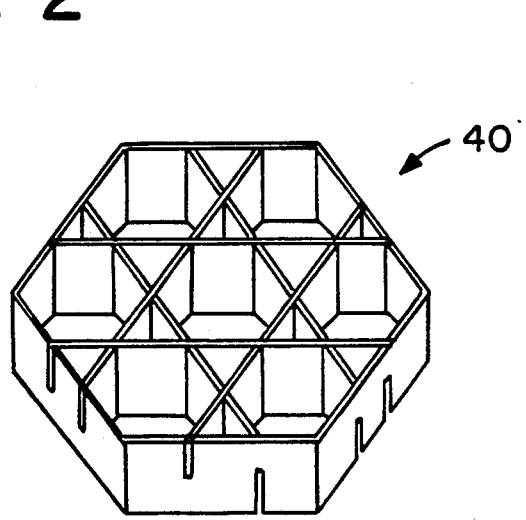
FIG. 4 is a perspective view of a complete core assembly.

FIG. 4 shows a complete core assembly 40 which may include struts 32 and 36 of FIG. 3 in a fully interlocked arrangement. Assembly 40 illustrates what is termed an "eggcrate" assembly.

Figure 5:
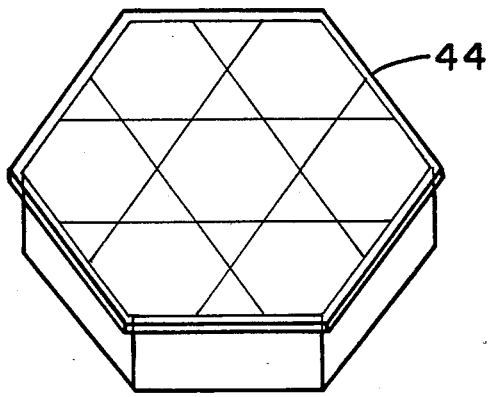
FIG. 5 is a perspective view of the core of FIG. 4 with a mirror blank attached.

In producing a mirror blank, as shown in FIG. 5, two firings are required to control distortion during crystallizing of the frit. Thus, green sheets, such as strips 24, are cut into struts of desired length and the struts are fired individually to sinter them. The sintered struts are then squared and slotted by machining for assembly in interlocking fashion. A frit sealing composition is applied at the joints, such as at interface 2 of slots 34 and 38 in FIG. 3.

If desired, the resulting core assembly 40 may then have strips or slurry of a sealing frit applied for assembly with a faceplate 44, as shown in FIG. 5. The resulting assembly may then be fired again at sintering temperature to effect frit sealing at the various interfaces, thus producing the fully sealed mirror blank assembly of FIG. 5. If a backing plate (not shown) is employed, it may be frit sealed to the back of core assembly 40 in the same manner as just described for faceplate 44.

While any compatible frit sealing composition may be employed, I have found it convenient to use the same glass as used to form the struts. A frit slurry may be formulated by mixing pulverized glass with pine oil in an amount of 15–35 weight percent pine oil or by using the same slurry as used to tape cast the struts. The slurry may be applied to the interfaces by brushing, with multiple coats being applied if necessary to fill the joints. The coated assembly is then fired to sintering temperature a second time, e.g., 90 minutes at 950° C.

Figure 6:
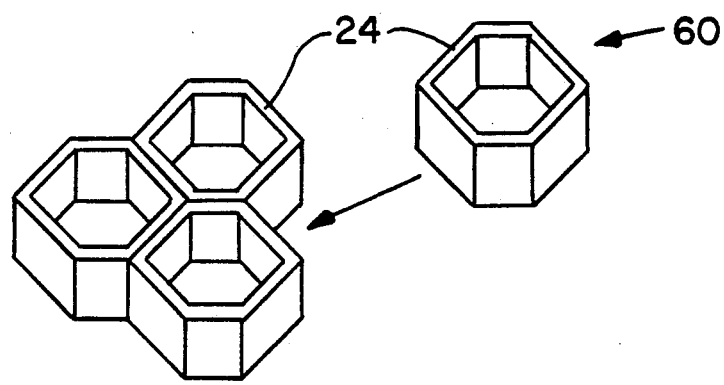
FIG. 6 is an exploded, fragmentary view of an alternative core assembly.
Figure 7:
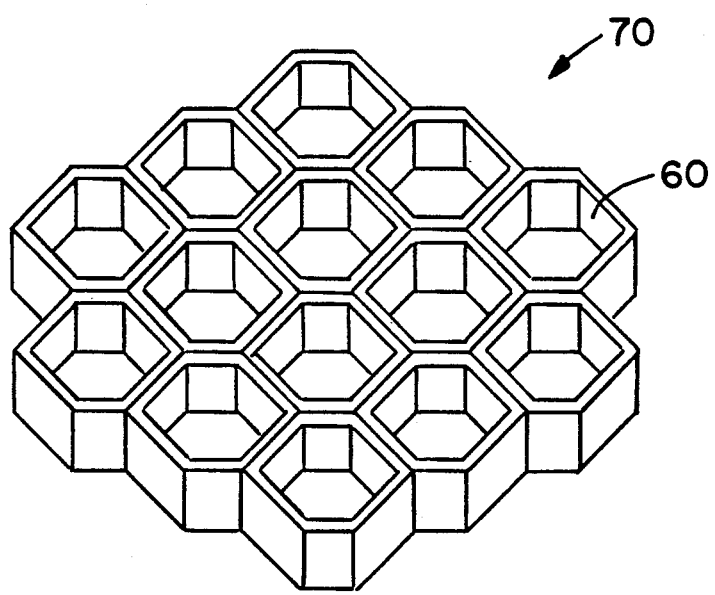
FIG. 7 is a perspective view of a complete alternative core assembly.

An alternative assembly, shown in FIGS. 6 and 7, is referred to as a "packed array". This assembly produces a core in a single firing, but requires a second firing to frit a plate, or plates, to the fired core.

Initially, tape cast strips, such as strip 24 in FIG. 2, are cut to predetermined length. The strip is then wrapped bout, and pressed against, a hexagonal mandrel to form a hexagonal tube 60 as shown in FIG. 6. Tubes formed in this manner may, for example, be 1.5 inches in diameter and one to two inches tall with a wall thickness of about 20 mils. Alternatively, hexagonal tubes 60 may be formed by extrusion.

The hexagonal tubes thus formed are then fritted together, as shown in FIG. 6, with a pine oil slurry as described earlier. The packed array thus assembled may then be fired at sintering temperature, e.g. 950° C. for two hours, to produce an integral core assembly as shown at 70 in FIG. 7.

Fritted and fired core assembly 70 may be machined to impart a curvature matching that of a mirror faceplate. The machined core assembly may then be frit sealed to the faceplate. Frit sealing slurry is applied along the tubular network surface and the faceplate placed over the coated core. The assembly is then fired at sealing temperature, e.g., 950° C., to frit seal the core to the faceplate.

Tape casting plus lamination also provides a rapid, relatively low temperature method for producing either the faceplate or the backing portion of a mirror. A backing plate, if used, is essentially a further means of strengthening the structure. Therefore, it is normally a flat plate requiring no particular curvature, and no special finish. Hence, tape casting is particularly adopted to forming such a plate.

With proper material selection, a faceplate may be formed to near-net shape, that is, to nearly the ultimate desired curvature. This reduces the grinding time required to impart the curvature.

In this procedure, a slurry is mixed and cast in the same manner as in forming strips for core struts. However, a sheet having the desired plate width is cast, rather than a narrow strip. The sheet may be cut to desired lengths, and the lengths stacked to provide the plate thickness ultimately desired. The stack of tape cast sheets is then laminated and sintered under pressure to form an integral body.

The required curvature in a faceplate may be imparted by pressing the stack while the laminates are still in the green state. Alternatively, the stack may be sagged into a mold of appropriate shape during the sintering step if one of the zinc aluminosilicate glasses described in the Hagy et al U.S. Pat. (No. 4,315,991) is employed. These glasses sinter as a glass and then crystallize. During the sintering step then, the viscosity of the glass becomes low enough for the stack to readily sag and take the contour of the supporting mold structure. Once the glass crystallizes, the body will hold the sagged shape during repeated firing. This permits frit sealing to a core member without loss of shape. Zirconia is a suitable refractory molding or supporting material, since it does not distort and remains inert at the firing temperatures employed.

A mirror faceplate thus formed may be frit-sealed to a core support as described earlier. The mirror face may then be ground and polished to the desired curvature. In order to provide a suitable surface for finishing, a sol or gel coating may be applied to the front surface. In this case, it is particularly desirable to have imparted an approximate curvature to the mirror plate.

By way of more specific illustration, a small mirror was constructed employing the eggcrate design for the core member. The mirror faceplate dimensions were 4.5"×6.5"×0.1". The plate was formed from a commercial glass having an approximate analysis of 92.5% by weight $SiO_2$ and 7.5% $TiO_2$.

The sintered core was 1.75" high and the struts provided 0.033" walls. The core design was a triangular grid with three-way strut joints as shown in FIGS. 3 and 4. The individual struts were tape cast from a slurry containing approximately 60% powdered glass frit and 40% organics.

A typical tape casting slurry composition has the following composition in parts by weight:
Ethanol: 31.7
Xylene: 50.7
Frit glass: 162.3
Dibutyl phthalate: 13.4
Polyvinyl butyral: 10.5

The several materials were added in the order shown to form the mixture. The frit glass was a thermally crystallizable, zinc aluminosilicate composition containing in percent by weight: 63.0% $SiO_2$, 20.5% $Al_2O_3$, 10.3% ZnO, 1.5% $Li_2O$, 3.9% $Cs_2O$ and 0.8% MgO.

The individual struts were fired at about 950° C. for 30 minutes while supported on zirconia pallets. After machining and slotting, the struts were assembled, sealing frit was applied at the joints, and the assembly fired to form the core unit.

The core was then bonded to the faceplate using ⅛" wide strips of tape cast frit laid out on the bottom of the faceplate in a pattern corresponding to the core geometry. Frit slurry was applied to fill any gaps, and the assembly fired in air for 90 minutes at about 950° C. The firing schedule, designed to minimize expansion mismatch was
RT to 200° C.: 100° C./hr.
200° C. to 600° C.: 45° C./hr.
600° C. to 950° C.: 150° C./hr.
Hold 950° C.: 90 minutes
950° C. to RT: 100° C./hr.

Expansion studies showed a coefficient of thermal expansion of about $-3 \times 10^{-7}/°$ C. between $-50°$ C. and $+120°$ C. The room temperature mismatch, that is, expansion difference over fritting range between the core and the faceplate, is 59.4 ppm. The modulus of rupture of the struts was 14 kpsi.

While the invention has been described in terms of tape casting strips and sheets, and this is the presently preferred method, it will be appreciated that, to some extent at least, extrusion procedures may also be employed. In particular, the tubular elements of FIGS. 6 and 7 would lend themselves to being formed by extrusion.

I claim:

1. In a telescope mirror blank comprising a faceplate and a supporting network core, the supporting network core being composed of a plurality of thermally crystallized glass struts, the crystallized glass having a coefficient of thermal expansion between $-10$ and $+10 \times 10^{-7}/°$ C. over the temperature range 0°-300° C., the struts being fused to the faceplate, the improvement wherein the network core structures are composed of sintered and crystallized glass powder and are frit sealed to one another to form a network which, in turn, is frit sealed to the faceplate.

2. A mirror blank in accordance with claim 1 wherein the ceramic struts are sintered, single layer, tape cast strips.

3. A mirror blank in accordance with claim 1 wherein the struts are laminated tape cast strips that have been sintered.

4. A mirror blank in accordance with claim 1 wherein the sealing frit is a crystallized glass-ceramic.

5. A mirror blank in accordance with claim 4 wherein the sintered struts and the sealing frit are composed of the same glass-ceramic material.

6. A mirror blank in accordance with claim 1 wherein the faceplate is composed of laminated sheets of tape cast, sintered ceramic.

7. A mirror blank in accordance with claim 6 wherein the laminated faceplate is composed of a crystallized glass-ceramic.

8. A mirror blank in accordance with claim 6 wherein the laminated faceplate is sagged to a curvature approximating that ultimately desired.

9. A mirror blank in accordance with claim 6 wherein the faceplate has a coating to facilitate polishing.

10. A mirror blank in accordance with claim 1 wherein at least a portion of the ceramic struts have slots cut partway across their width whereby the strips are assembled in eggcrate style to form a network.

11. A mirror blank in accordance with claim 1 further comprising a backing plate frit sealed to the network core.

12. A mirror blank in accordance with claim 11 wherein the backing plate is composed of a sheet of sintered ceramic.

13. A mirror blank in accordance with claim 12 wherein the backing plate is composed of laminated sheets of tape cast, sintered ceramic.

14. In a method of producing a telescope mirror blank comprising a faceplate and a supporting network core, the supporting network core being composed of a plurality of glass-ceramic struts, the glass-ceramic having a coefficient of thermal expansion between $-10$ and $+10 \times 10^{-7}/°$ C. over the temperature range $0°-300°$ C., the struts being fused to the faceplate, the improvement which comprises the steps of forming a slurry from a powdered thermally crystallizable glass capable of being converted to a glass-ceramic having a coefficient of thermal expansion between $-10$ and $+1\text{-}\times 10^{-7}/°$ C. over the temperature range $0°-300°$ C., forming thin-walled struts from the slurry, sintering the struts, assembling and sealing the strauts together with a thermally crystallizable glass frit to form a rigid network core, and sealing the network core to the faceplate with a thermally crystallizable glass frit.

15. A method in accordance with claim 14 wherein the slurry is tape cast to form strips, firing the strips and cutting them to size to form struts for assembly.

16. A method according to claim 15 wherein two or more strips are laminated in the green state to form thicker strips.

17. A method according to claim 15 wherein the struts are slotted to permit assembly in eggcrate style to form a network.

18. A method according to clair 14 wherein the struts are frit sealed with the same crystallizable glass as the struts were formed from.

19. A method according to claim 14 wherein a mirror faceplate is formed by laminating together sheets of green ceramic corresponding to the core struts.

20. A method according to claim 19 wherein the laminated sheets are sintered to form a rigid faceplate and are sagged during firing to approximate the ultimate curvature.

21. A method according to claim 20 wherein the faceplate surface is coated to facilitate polishing.

22. A method according to claim 14 wherein the network core is frit sealed to a backing plate.

23. A method according to claim 22 wherein the backing plate is a sheet of sintered ceramic.

24. A method according to claim 23 wherein the sheet is formed by tape casting and then sintered.

25. A method according to claim 23 wherein the sheet is formed by laminating two or more tape cast sheets and sintering the laminate.

26. A method according to claim 23 wherein the sheet is formed by extrusion and then sintered.

* * * * *